Nov. 27, 1962

A. ROMAK 3,065,780

DEVICE FOR STRAIGHTENING WHEEL ASSEMBLY ELEMENTS

Filed Aug. 7, 1959

INVENTOR:
Albert Romak

BY:

Horton, Davis, Brewer & Brugman
ATTORNEYS

Nov. 27, 1962

A. ROMAK 3,065,780

DEVICE FOR STRAIGHTENING WHEEL ASSEMBLY ELEMENTS

Filed Aug. 7, 1959

INVENTOR:
Albert Romak

BY:
Horton, Davis, Brewer & Brugman
ATTORNEYS

Nov. 27, 1962     A. ROMAK     3,065,780
DEVICE FOR STRAIGHTENING WHEEL ASSEMBLY ELEMENTS
Filed Aug. 7, 1959     3 Sheets-Sheet 3

INVENTOR:
Albert Romak
BY
ATTORNEYS

United States Patent Office 3,065,780
Patented Nov. 27, 1962

3,065,780
DEVICE FOR STRAIGHTENING WHEEL
ASSEMBLY ELEMENTS
Albert Romak, 429 Mador Drive, North Lake, Ill.
Filed Aug. 7, 1959, Ser. No. 832,291
1 Claim. (Cl. 153—32)

This invention relates to a device for straightening elements of a wheel assembly, and more particularly, to a device for straightening wheels and brake drums.

To prevent uneven tire wear and dangerous fatigue strains caused by vibrations, it is essential that wheels on automotive vehicles are true. In use, wheel assemblies are subjected to many strains which may generally be categorized as vertical strains caused by running over holes or rocks, and horizontal strains caused by sliding sideways, skidding into curbs and the like. During use wheels frequently become bent due to horizontal, vertical or combined horizontal and vertical strains and when this occurs it is necessary to straighten or replace the bent portion of the wheel assembly.

For purposes of this discussion a wheel will be considered constructed of a rim portion, a web portion, and a hub portion. The rim portion is the cylindrical channel-shaped member upon which the tire is mounted. Because of its shape and disposition during use on a vehicle it has great strength to resist both horizontal and vertical strains and experience shows that a bend producing a permanent set in the rim portion is rare.

The hub portion is the small central area extending from the center of the wheel assembly to an area just beyond the lug receiving holes that wheels are made with. The hub portion resists strains because it is held by lug bolts or nuts in such firm contact with the massive elements of the brake drum assembly that it acts as a part of that assembly.

The web portion connects the rim portion with the hub and is usually constructed of the same piece of metal as the hub. The web is usually constructed as a disc having at least one annular corrugation to provide a spring-like action and some resistance to horizontal strain. The web portion of the wheel is the portion in which the preponderance of wheel bends occur.

The brake drum assembly is usually constructed of a group of cylindrical and truncated conical elements which are constructed massively to perform their function and inherently possess resistance to strain. These cylindrical or truncated conical elements have different diameters and are connected with annulus-shaped disc-like elements which are positioned in a vertical plane thereby possessing resistance to vertical strains, but which are vulnerable to deformation by horizontal strains. As a result the great preponderance of bends in brake drum assemblies are in the annulus-shaped discs, and since these discs are restrained by continuous connections around both their inner and outer circumferences, a deformation on one side of a brake drum will produce a corresponding opposite deformation diametrically opposed thereto.

Brake drums and wheels are costly enough so that straightening them when they become bent is economical even though most available straightening equipment is elaborate and requires dismounting the tire from the wheel to be employed.

It is an object of my invention to provide a simple device that is capable of straightening various elements of a vehicle wheel assembly.

It is another object of my invention to provide a simple device that is capable of straightening a vehicle wheel without dismounting the tire from the wheel, which straightens the wheel regardless of which way it is bent and which gauges the straightness of the wheel.

My invention broadly comprises two members, each having a planar configuration and which are held rigidly and spaced apart with the planar configurations of the two elements in parallel relationship. One planar configuration is a work holding member adapted to hold the bent wheel assembly member and the other is a force bearing member adapted as a bearing surface against which a jack or other extendable force exerting means may push. The planar configuration adapted to hold the bent element holds it so that the bent portion is forced into its normal position by being pushed toward the work holding surface, in other words, the wheel bends away from the work holding member. The force exerting means, or jack may be employed in combination with the spaced planar configurations to perform accurately the function of gauging to determine when the wheel is straight and to determine where the maximum bend is. The combination of this invention is very flexible in its use and is capable of exerting force at any point on the wheel assembly and may be employed with any size wheel.

Other objects and advantages of my invention will be apparent from the following description of the drawings in which.

Figure 1:
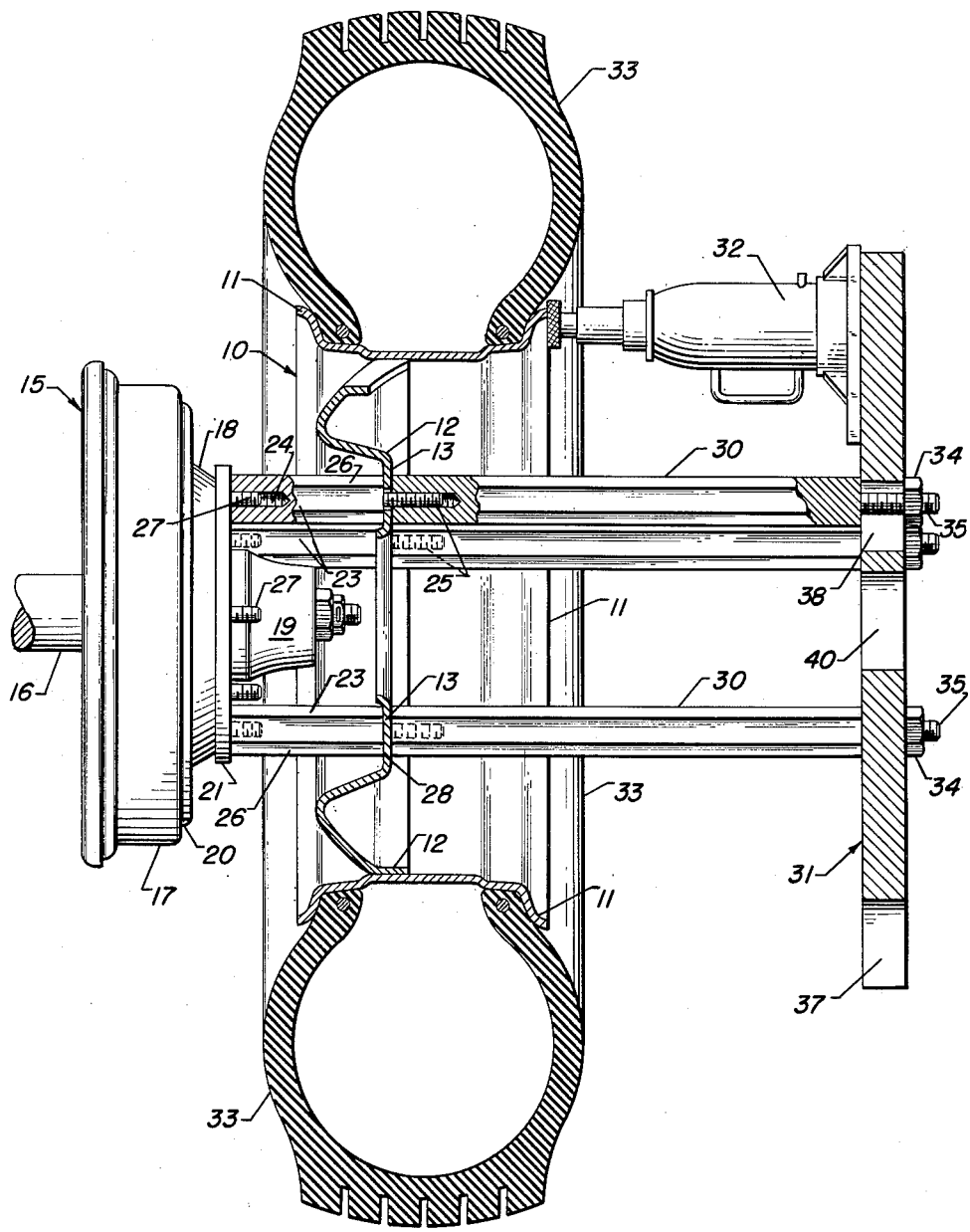
FIG. 1 is a partial sectional elevation view of an embodiment of my invention illustrating its use in straightening a wheel.
Figure 5:
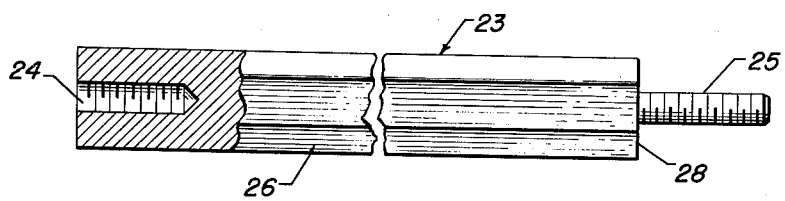
FIG. 5 is a fragmentary partial sectional view of a member useful as a work holding member and as a spacing element depending on its length.

As best shown in FIG. 1 a wheel 10 consisting of a rim portion 11, a web portion 12 and a hub portion 13 is connected to a brake drum 15. The brake drum, which is shown as mounted on a vehicle on axle 16, is made of a cylindrical braking surface 17, a conical member 18, a hub member 19, a large connecting disc 20 and a small connecting disc 21. The wheel is attached to and spaced from the brake drum through work holding members or lug extensions 23 which consist of a threaded bore 24, a threaded projection 25 and a hexagonal bar 26. The lug extensions 23 screw onto lugs 27 and hold the wheel spaced from the brake drum so that it can be bent toward the brake drum. The shoulders 28 on the lug extensions 23 are all the same distance from the brake drum so that the collective function of the lug extensions 23 is to form a work holding member the shoulders of which form a planar configuration. Spacing members 30 may be constructed similarly to but longer than the lug extensions. The spacing members are shown in FIG. 5 constructed of hexagonal bar stock having a threaded cavity to engage the threaded projections 25 in the same manner that the threaded bore 24 engages the lug. Furthermore, spacing members 30 have shoulders and projections at the other end thereof which hold the parallel bearing plate 31 parallel to the planar configuration formed by lug extensions 23, spaced therefrom and held rigidly fixed with relation thereto. A jack 32 placed between parallel plate 31 and the bent portion of the wheel 10 may be extended to produce the force required to return the bent wheel to its proper straight position. It may be seen from FIG. 1 that this may be accomplished without removing tire 33 from the rim.

Since bent wheels are usually caused by skidding into curbs, most are bent toward the brake drum, or under the car. It is a feature of this invention that wheels bent in either direction may be straightened without dismounting the tire from the wheel assembly thereby requiring major disassembly operations. Straightening is accomplished by placing the wheel on the lug extensions 23 with the bent portion bending away from the brake drum. The wheel is held firmly to extensions 23 by fixing at least three spacing members 30 on threaded projections 25. Plate 31 is then mounted on spacing members 30 by screwing nuts 34 over the threaded projections 35 of the spacing members. Thus assembled, the shoulders of lug extensions 23 lie in a plane that is parallel to plate 31.

In operation jack 32 is extended until it is in contact with the rim 11 of the wheel. To find the bent portion the jack is slid around the rim until it is jammed between the rim and plate 31 and this position is marked. The jack is then slid around in the other direction until it is again jammed between rim 11 and plate 31 and this position is marked. The position at which the greatest bend exists is halfway between the marked points of jamming. This point may be located more accurately by retracting the jack slightly so that there is less distance between points of jamming. When the point of maximum bend is located the jack is positioned to exert force against it and the jack is operated to bend the wheel back slightly farther than to its normal position. The jack is then released and the gauging operation just described is repeated. Alternate bending and gauging operations are effected until the wheel is straight and usually straightening can be accomplished with four or five steps. Although illustrated as applying force against rim 11, the jack 32 may perform its function by applying force against the web 12 or even the hub 13.

Figure 2:
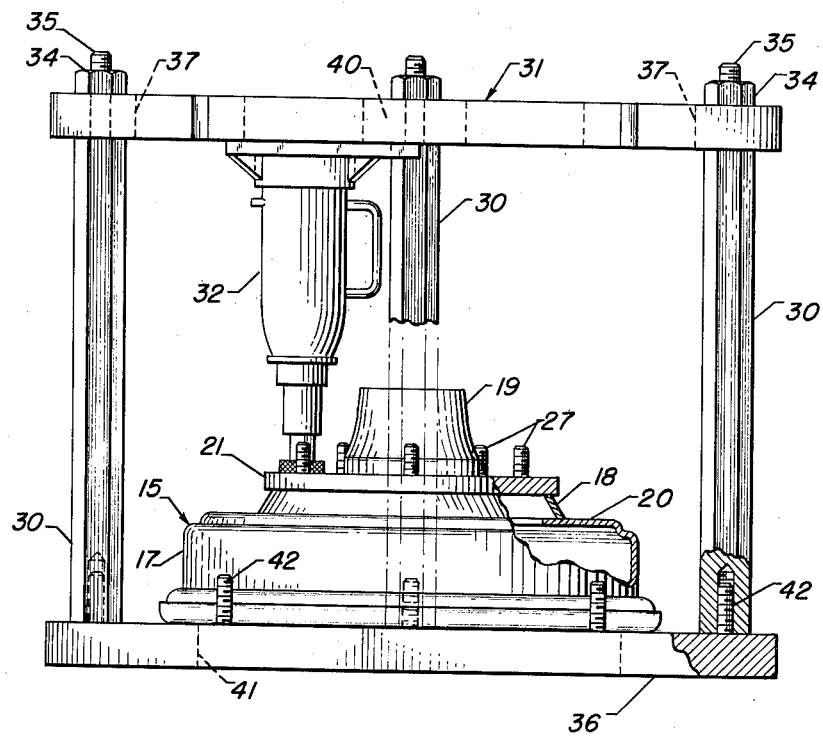
FIG. 2 is a partial sectional view of an embodiment of my invention illustrating its use in straightening a brake drum.

When employing this invention in straightening a brake drum, a device such as the one illustrated by FIG. 2 may be employed. The work holding member 36 is in this case a flat metal plate, which is held a fixed distance from and parallel to another plate 31. As hereinbefore stated, when the annulus-shaped discs of a brake drum are bent, an equal and opposite bend occurs diametrically opposed to the first because the annulus-shaped member is restrained around both the internal and external circumferences. Accordingly, pushing one side of the bent brake drum down to its normal position will cause the other side to pull up to its normal position.

Figure 3:
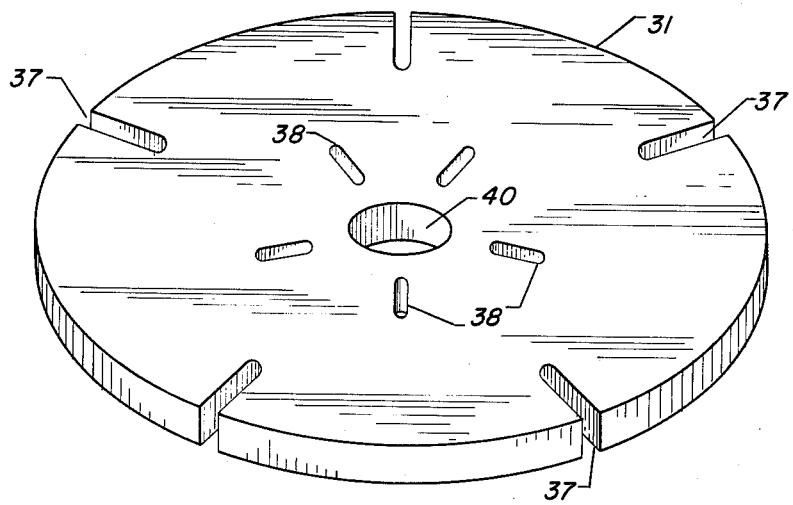
FIG. 3 is an isometric view of a suitable force bearing member.

It may be noted that the spacing members 30 are around the exterior of the brake drum straightening device in FIG. 2 thereby permitting free acceess of the jack to any portion of the brake drum while the spacing elements in the embodiment of FIG. 1 are centrally located thereby providing alignment with the lugs 27 and permitting the jack to have free access to all portions of the wheel beyond the hub. To provide a plate 31 capable of use in both embodiments, it is desirable to construct the plate as shown in FIG. 3 with peripheral slots 37 to receive spacing members as shown in FIG. 2 and with intermediate slots 38 to receive the spacing members as shown in FIG. 1. For ease in assembly, the intermediate slots may be extended to intersect a central opening 40.

Figure 4:
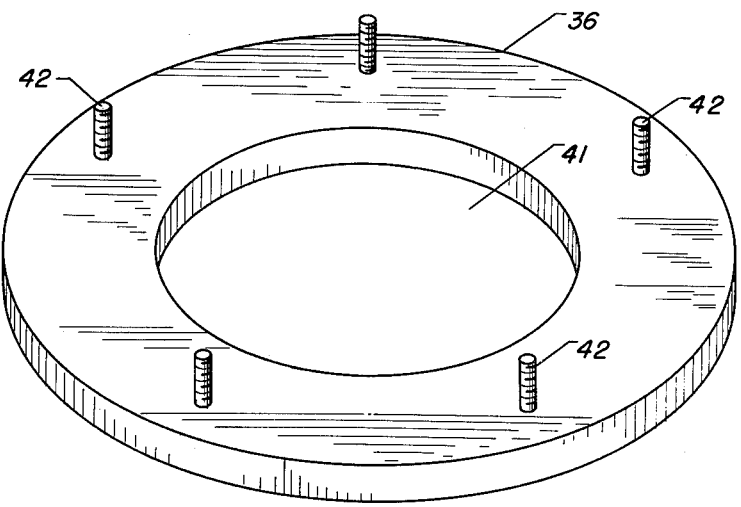
FIG. 4 is an isometric view of a work holding member.

The work holding plate employed to straighten a brake drum may be a solid flat plate as shown in FIG. 4 having lugs 42 extending from a flat surface in a circle the same diameter as the circle formed by the peripheral slots in the parallel plate and spaced similarly. To increase the utility of this work holding member, a large central opening 41, large enough to receive the small connecting disc 21 and large conical member 18 of the brake drum may be in the work holding member. When the work holding member is installed with a recess beneath it, the brake drum can be placed to nest in the opening 41 and when in that position, force can be exerted against the interior surfaces of the brake drum.

Many modifications and variations of the devices shown and described as illustrative may be made within the scope of this invention. For example, the force exerting means may bear on a bottom plate or it may be movable on a track, the work holding means may be continuously or intermittently pivotable, the spacing means may be in the form of walls or clamps and may be integral with either or both of the bearing member and the work holding member.

From the foregoing description it may be seen that this invention provides a simple and inexpensive device which can be readily employed in service stations and garages that cannot house or afford large scale equipment, and this device, employing an ordinary jack or equivalent means, is capable of straightening wheels and brake drums that have become bent in use to a high degree of accuracy.

Having thus described my invention, what I claim is:

A device for straightening a bent vehicle wheel comprising in combination a plurality of equal-length lug extensions having shoulder portions from which threaded portions extend, a rigid plate, at least three spacing members and a force-exerting means, said lug extensions connecting to the lugs of a wheel assembly so that said shoulder portions all lie in the same plane to form a planar configuration on which a wheel is mounted with said threaded portions extending through lug receiving holes in said wheel, said spacing members attached to said lug extensions to hold said wheel thereon and to said rigid plate and said force exerting means connected to exert force between said rigid plate and a wheel mounted on the lug extensions.

References Cited in the file of this patent

UNITED STATES PATENTS

| | | |
|---|---|---|
| 1,393,035 | Morris | Oct. 11, 1921 |
| 1,548,521 | Fowler | Aug. 4, 1925 |
| 1,650,216 | Ingham | Nov. 22, 1927 |
| 1,690,006 | Furbush | Oct. 30, 1928 |
| 1,786,847 | Hunt | Dec. 30, 1930 |
| 2,165,504 | Pfauser | July 11, 1939 |
| 2,205,532 | Kohl | June 25, 1940 |
| 2,233,371 | Smith | Feb. 25, 1941 |
| 2,282,118 | Daniel | May 5, 1942 |
| 2,489,815 | Rader | Nov. 29, 1949 |

FOREIGN PATENTS

| | | |
|---|---|---|
| 671,434 | Germany | Feb. 7, 1939 |